D. H. SOUTHWORTH.
Rice and Smut Machine.
No. 892.
Patented Aug. 23, 1838.
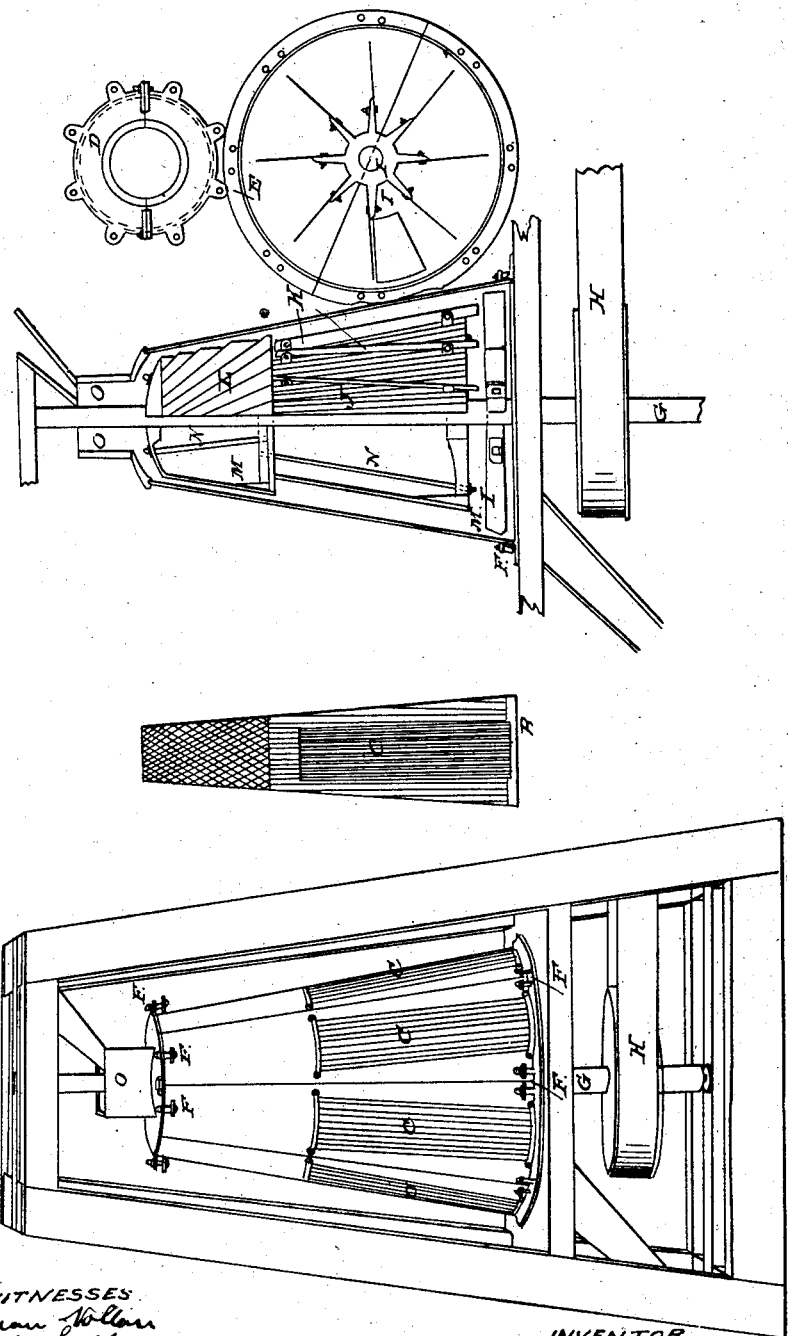
WITNESSES
INVENTOR

UNITED STATES PATENT OFFICE.

DANIEL H. SOUTHWORTH, OF LITTLE FALLS, NEW YORK.

IMPROVEMENT IN SMUT-MACHINES FOR CLEANING RICE, WHEAT, AND OTHER KINDS OF SMALL GRAIN.

Specification forming part of Letters Patent No. 892, dated August 23, 1838.

*To all whom it may concern:*

Be it known that I, DANIEL H. SOUTH-WORTH, of Little Falls, Herkimer county, State of New York, have made certain Improvements in the Manner of Constructing Machines for Cleansing Rice, Wheat, and other Kinds of Small Grain, for which machine I originally obtained Letters Patent dated the 23d day of August, 1838; and I do hereby declare that the following is a full and exact description of my said improvements.

The principal object had in view by me in my improvements is to adapt my machine more perfectly than under its original construction to the breaking up and removal of garlic from the grain, and this I effect by substituting for the cast-iron conical rubber (marked L in the drawings of my original specification) a conical rubber covered with card-teeth or elastic-wire points, between which and the upper part of the staves of cast-iron, which constitute the outer shell or case of my machine, the grain is to be forcibly rubbed, so as to cut or break the cloves of garlic, and thus to prepare them for being cleaned or blown out by the operation by which the chaff and other foreign matters are separated from the grain. The inner surface of this part of the staves or outer shell is for this purpose made rough, as described in the specification of my Letters Patent above named. I intend, however, instead of the rough or checkered surface formed on this part in the casting, to use sometimes a lining of card-teeth or of pointed wires similar to those with which the conical rubber is covered; but it will be best in general to make them shorter and stiffer than those on the conical rubber.

In my original machine the outer shell or case was made in the form of a frustum of a cone from bottom to top; but I now give a greater slope to the conical rubber and to the part containing it than was given in my original machine, while that portion of the revolving conical body which is below the rubber and which carries the spiral beaters remains as before. The exterior case and the interior revolving conical body are made, therefore, in the form of the frustra of two cones, the base of the upper, which constitutes the rubbing part, resting upon the upper end of that part which contains the beaters. By this construction, when the shaft and the revolving body attached to it are raised by means of the bridge-tree or by any other analogous device, the toothed rubber will be made to advance more rapidly against the upper portion of the outer case than the beaters will against the lower portion of said case, and the force to which the grain is subjected, so as to cut or break the garlic, as well as rub and divide all other foreign matter capable of being so broken, will be rapidly increased. In other respects my machine is substantially the same with that originally patented by me, the wings I, the beaters K, and the conical body J remaining unchanged. I now, however, cast the exterior shell in four or in six pieces only, instead of in eight, as named in my original specification, and have also made some other changes in the manner of putting the machine together; but which changes do not in any way affect the principle upon which it is constructed or its mode of operation.

In the accompanying drawings I have represented the machine as now improved, one-half of the staves being removed for the purpose of showing the interior.

B is the lower portion of the external conical case, which is cast with openings to contain square rods or bars of iron, so placed as that one angular edge shall point inward toward the axis of the machine, as described in my original specification and shown at C in the drawings attached thereto, said rods or bars being placed with their lateral angular edges at a small distance apart, leaving sufficient space to allow of the escape of dust while the grain is detained.

D is the upper portion of the outer case, which, as above described, forms an angle at the point of junction between it and the lower portion B. The toothed rubber, formed of card-teeth or wire points, is shown at L taking the place of the cast-iron roller L in my original machine. The interior E of the outer case may, as before noticed, be lined with wire teeth or may be left rough, as may be found most expedient.

K K are the spiral iron beaters which are fixed upon the revolving body or inner cone J.

The wings I I for aiding in producing a current of air are employed, as before.

I have made provision in my improved machine for changing the direction of its revolution, which is sometimes desirable, especially when the grain to be cleaned is to be acted upon by the rubber of card-teeth with less force than usual. These beaters I attach to ears $a\ a$, projecting out from the conical body J, and for the purpose of changing their direction I make an extra set of such ears, as shown at $a'\ a'$, to which and to the reversed sides of the upper ears the beaters may be screwed or otherwise attached.

Having thus fully described the nature of my improvements, what I claim therein, and desire to secure by Letters Patent, is—

The employment of a conical rubber of card-teeth or elastic-wire points in the place of my cast-iron conical rubber, as described in my original patent, and this I claim whether said card-teeth or elastic-wire points be made to act upon the grain against the rough interior of the outer cone or shell or against the same part lined with wire teeth or points, as set forth.

D. H. SOUTHWORTH.

Witnesses:
THOS. P. JONES,
M. A. SOUTHWORTH.